US012789150B2

(12) United States Patent
Wruck et al.

(10) Patent No.: US 12,789,150 B2
(45) Date of Patent: Nov. 10, 2026

(54) PASSIVE GAS MIXER WITH A HOLLOW SCREW

(71) Applicant: Drägerwerk AG & Co. KGaA, Lübeck (DE)

(72) Inventors: Norbert Wruck, Lübeck (DE); Carsten Stemich, Lübeck (DE)

(73) Assignee: DRÄGERWERK AG & CO. KGAA, Lübeck (DE)

( * ) Notice: Subject to any disclaimer, the term of this patent is extended or adjusted under 35 U.S.C. 154(b) by 1075 days.

(21) Appl. No.: 17/887,578

(22) Filed: Aug. 15, 2022

(65) Prior Publication Data

US 2023/0054509 A1 Feb. 23, 2023

(30) Foreign Application Priority Data

Aug. 18, 2021 (DE) .................... 10 2021 121 413.0

(51) Int. Cl.

| | |
|---|---|
| ***B01F 25/4314*** | (2022.01) |
| ***B01F 23/10*** | (2022.01) |
| ***B01F 35/21*** | (2022.01) |
| *B01F 101/22* | (2022.01) |
| *B33Y 80/00* | (2015.01) |

(52) U.S. Cl.

CPC .......... *B01F 25/4314* (2022.01); *B01F 23/10* (2022.01); *B01F 35/2115* (2022.01); *B01F 2101/22* (2022.01); *B01F 2215/0472* (2013.01); *B33Y 80/00* (2014.12)

(58) Field of Classification Search

CPC .. B01F 23/10; B01F 25/4314; B01F 25/4341; A61M 16/12

See application file for complete search history.

(56) References Cited

U.S. PATENT DOCUMENTS

| | | | | |
|---|---|---|---|---|
| 2,784,948 A * | 3/1957 | Pahl | .................... | B01F 25/3131 366/178.2 |
| 3,404,869 A | 10/1968 | Harder | | |
| 5,967,141 A | 10/1999 | Heinonen | | |
| 9,708,185 B2 * | 7/2017 | Livshits | .................. | F23D 14/62 |
| 2010/0269826 A1 | 10/2010 | Colombo et al. | | |

FOREIGN PATENT DOCUMENTS

| | | |
|---|---|---|
| CN | 101554504 A | 10/2009 |
| CN | 101980738 A | 2/2011 |
| CN | 102112215 A | 6/2011 |
| CN | 102186570 A | 9/2011 |
| CN | 105920711 A | 9/2016 |

(Continued)

*Primary Examiner* — Elizabeth Insler

(74) *Attorney, Agent, or Firm* — McGlew and Tuttle, P.C.

(57) ABSTRACT

A gas mixer (100), to which a first gas and a second gas are fed, mixes the two fed gases to form a gas mixture. A helical component (2) is arranged in an interior of an outer component (5). A helical mixing cavity (20) is formed between the outer component and the helical component (2). An additional mixing volume (6) is located in the interior of the outer component (5) or in the interior of the helical component (2). One gas is sent through a first feed line (31) to the helical mixing cavity (20), and the other gas is sent through a second feed line (32) to the additional mixing cavity (6). A gas mixture discharge line (40) discharges the produced gas mixture from the helical mixing cavity (20).

16 Claims, 10 Drawing Sheets

(56) References Cited

FOREIGN PATENT DOCUMENTS

| | | | |
|---|---|---|---|
| CN | 106535972 | A | 3/2017 |
| CN | 108843372 | A | 11/2018 |
| CN | 109701131 | A | 5/2019 |
| CN | 110167662 | A | 8/2019 |
| CN | 213158600 | U | 5/2021 |
| DE | 102008057180 | B3 | 4/2010 |
| DE | 102012008108 | A1 | 10/2013 |
| DE | 102016001383 | A1 | 8/2017 |
| DE | 102020000267 | A1 | 7/2021 |
| DE | 102020000268 | A1 | 7/2021 |
| EP | 0815929 | A1 | 1/1998 |
| EP | 0874785 | B1 | 10/2001 |
| EP | 1920822 | A2 | 5/2008 |
| JP | S6316037 | A | 1/1988 |
| JP | 2000140595 | A | 5/2000 |
| WO | 2018117040 | A1 | 6/2018 |

* cited by examiner

PASSIVE GAS MIXER WITH A HOLLOW SCREW

CROSS REFERENCE TO RELATED APPLICATIONS

This application claims the benefit of priority under 35 U.S.C. § 119 of German Application 10 2021 121 413.0, filed Aug. 18, 2021, the entire contents of which are incorporated herein by reference.

TECHNICAL FIELD

The present invention pertains to a gas mixer, to which a first gas and a second gas are fed, and which mixes the two fed gases to form a gas mixture. Furthermore, the present invention pertains to a system for supplying a patient with a gas mixture, wherein the system comprises such a gas mixer.

TECHNICAL BACKGROUND

The task of mixing two gases with one another occurs, for example, when a patient shall be anesthetized and is therefore ventilated (mechanically ventilated). A ventilator or another medical device feeds to the patient a gas mixture consisting of a carrier gas (the first gas, comprising breathing air and/or oxygen) and anesthetic, comprised of at least one anesthetic agent, (the second gas). This task also occurs when the intrinsic breathing activity of a patient shall be assisted by a ventilation and a mixture of two gases, e.g., breathing air and oxygen, shall be fed to the patient. A gas mixer accomplishes in both applications the task of mixing these two gases with one another.

It is desired in many cases that a gas mixer produce a gas mixture with a high mixing quality. High mixing quality means that the concentration of at least one gas in the gas mixture at a given time varies only relatively little in space (location). The concentration may, of course, vary over time, even in case of a high mixing quality. In addition, a gas mixture having an especially simple configuration is desired.

A device that is capable of mixing a gas with a liquid in a container 101, is described in WO 2018/117040 A1. The liquid is introduced through an inlet 103 into the container 101, and the gas is introduced through an inlet 102. A mixer (swirling portion 110) with a cylindrical body 110*a* and with a plurality of axially projecting baffles 110*b* mixes the gas with the liquid in a space between the inner wall of the container 101 and the outer wall 110. The mixture is drained from an outlet 104.

SUMMARY

A basic object of the present invention is to provide a gas mixer, which achieves a relatively high mixing quality and has a relatively simple configuration.

The object is accomplished by a gas mixer according to the invention. Advantageous embodiments are described in this disclosure.

The gas mixer according to the present invention is capable of mixing a first gas and a second gas to form a gas mixture. The gas mixture is optionally capable of mixing at least three gases with one another to form a gas mixture. The gas mixer is configured such that the first gas, the second gas and optionally the third gas are fed to the gas mixer via a feed line each and the gas mixture produced is removed via a gas mixture discharge line. A "gas" is preferably defined as a substance that is gaseous at least in a temperature range between 0° C. and 30° C. and especially preferably between 0° C. and 40° C. At least one of the gases, e.g., breathing air, may, of course, consist itself of a plurality of constituents.

The gas mixer according to the present invention comprises an outer component and a helical component (screw). The helical component is located in the interior of the outer component. The outer component consequently encloses the helical component completely or at least partially. The outer circumference of the helical component, i.e., the outer circumference of the thread of the screw, is in fluid-tight contact with the inner wall of the outer component. "Fluid-tight" means tight for fluids aside from gaps between the two components, which cannot frequently be avoided especially because of manufacturing tolerances and temperature fluctuations and which do not substantially compromise the function of the gas mixer. The "outer circumference" of the helical component is the area that has the greatest distance from a central axis of the helical component.

A helical mixing cavity, whose contour is defined by the inner wall and hence by the inner contour of the outer component, on the one hand, and by the outer wall and hence by the outer contour of the helical component, on the other hand, is formed between the outer component and the helical component.

At least one additional mixing cavity is formed in the interior of the gas mixer, i.e., in the space enclosed by the outer wall of the outer component. The additional mixing cavity or an additional mixing cavity is located according to a first alternative of the present invention in the interior of the helical component. According to a second alternative, the additional mixing cavity or an additional mixing cavity is located in the interior of the outer component, i.e., it encloses the helical component. A combination of these two alternatives is possible, i.e., a first additional mixing cavity is arranged in the interior of the helical component and a second additional mixing cavity is arranged in the interior of the outer component.

A respective distance develops between the additional mixing cavity or each additional mixing cavity and the helical mixing cavity. A distance preferably likewise develops between the two additional mixing cavities in case of two additional mixing cavities.

At least one radial duct connects the additional mixing cavity to the helical mixing cavity. Depending on where the additional mixing cavity is arranged, this radial duct passes through the helical component or through the outer component. A plurality of parallel radial ducts preferably connect the additional mixing cavity to the helical mixing cavity. In case of a plurality of additional mixing cavities, at least one respective radial duct and preferably a plurality of respective radial ducts per mixing cavity connects/connect each additional mixing cavity to the helical mixing cavity.

Both the helical mixing cavity and the additional mixing cavity or each additional mixing cavity are each in a fluid connection with a respective feed line. The one mixing cavity (helical or additional mixing cavity) is in a fluid connection with a feed line for the first gas, and the other mixing cavity is in a fluid connection with a feed line for the second gas. In case of a gas mixer with two additional mixing cavities, a first additional mixing cavity is in a fluid connection with a feed line for the second gas and a second additional mixing cavity is in a fluid connection with the same feed line or with an additional feed line for the second gas or with a feed line for a third gas, wherein the third gas is different from the first gas and from the second gas. Each gas can flow through a respective feed line each and through the fluid connection into a mixing cavity.

A gas mixture discharge line is in a fluid connection with the helical mixing cavity or with the additional mixing cavity or with an additional mixing cavity, preferably with the helical mixing cavity. The gas mixture produced flows off through this gas mixture discharge line from the gas mixer.

The two gases can be delivered especially in at least one of the following manners to the gas mixture:

An overpressure, which presses the first gas or the second gas and preferably both gases into the gas mixer, prevails in the feed line for the first gas and/or in the feed line for the second gas.

The produced gas mixture is sucked by a vacuum in the gas mixture discharge line from the gas mixer, as a result of which the first gas and/or the second gas and preferably both gases are sucked into the gas mixer.

Both embodiments eliminate the need for the gas mixer itself to comprise a feed unit. The two embodiments may be combined with one another. It is, however, also possible to connect the gas mixer according to the present invention to a feed unit or to provide the gas mixer according to the present invention with a feed unit.

The one gas is delivered into the helical mixing cavity and is forced there to move along a helical trajectory. The outer component as well as the helical component prevent this one gas from leaving this helical trajectory in a way other than through the radial duct or through a radial duct.

The other gas or each other gas is fed into the additional mixing cavity or into at least one additional respective mixing cavity. The additional mixing cavity or each additional mixing cavity is formed according to the present invention in the interior of a component of the gas mixer, namely, in the interior of the helical component or in the interior of the outer component. This component, which encloses the additional mixing cavity, prevents the other gas from leaving the additional mixing cavity in a way other than through a radial duct. The outer component and the helical component are impermeable to the gases, being so optionally aside from often unavoidable gaps.

The one gas is in the helical mixing cavity, and the other gas is in the additional mixing cavity. When the gas in the helical mixing cavity is under a pressure that is higher than the pressure of the gas in the additional mixing cavity, the gas in the helical mixing cavity is fed through the radial ducts from the helical mixing cavity into the additional mixing cavity or into at least one additional mixing cavity and is mixed with the other gas there. When the gas in the additional mixing cavity or in an additional mixing cavity is under a pressure that is higher than the pressure of the gas in the helical mixing cavity, the gas in the additional mixing cavity is fed through the radial ducts from the additional mixing cavity into the helical mixing cavity and is mixed with the other gas there.

If the gas mixture is sucked into the gas mixture discharge line, the two gases are sucked into the additional mixing cavity that is in a fluid connection with the gas mixture discharge line, and they are mixed in this mixing cavity. The first gas and the second gas may be under the same pressure or under different pressures in this embodiment. It is possible that one gas flows from time to time in one direction and from time to time in another direction through the radial ducts, for example, because one gas is under a higher pressure at times and the other gas is under a higher pressure at another time.

The two gases are mixed thoroughly in all these cases. Due to a relatively simple mechanical construction, the present invention makes it possible in many cases for the produced gas mixture to have a sufficiently high mixing quality. "Mixing quality" is defined as an indicator of the variation in space (location) of the concentration of the first gas or of the second gas in the gas mixture produced. The concentration of the first gas or the concentration of the second gas is ideally the same everywhere, i.e., there is no variation in space. The concentration of a gas in the gas mixture may, of course, change over time. The gas mixer according to the present invention is also capable in many cases of mixing at least three gases thoroughly.

The gas mixer according to the present invention can be embodied as a passive mechanical component, i.e., as a static gas mixer. In particular, it is possible thanks to the present invention to embody the gas mixer according to the present invention such that the gas mixer does not comprise any movable components and also no component through which an electrical current flows. No motor or other drive is preferably needed. The gas mixer according to the present invention doers not therefore need to be connected to a power supply network or to a power supply unit, and an electrical insulation is not necessary. Monitoring to determine whether a movable component is indeed able to move as required is not necessary.

In many cases, the gas mixer according to the present invention has smaller dimensions and/or a lower weight than other gas mixers have. In particular, a good compromise is achieved between a requirement for a small space and a requirement for a large space for mixing and hence for a high mixing quality especially thanks to the helical component.

The gas mixer according to the present invention can be embodied as a mechanically stable and simple gas mixer. All components of the gas mixer, aside from optional seals, may be mechanically rigid components, i.e., they may be neither elastically nor plastically deformable. This embodiment increases the stability or reduces the wear of the gas mixer compared to an embodiment in which a larger component is elastic.

The outer component and the helical component preferably extend along the same longitudinal axis. This longitudinal axis is preferably the common central axis of the two components. The outer component preferably has the shape of a cylinder or of a truncated cone. It is also possible that the outer component has the shape of a column with N edges, wherein N>=3 and wherein the edges are rounded in order to reduce the risk of swirling in the mixing cavity.

According to the present invention, the gas mixture discharge line preferably discharges the produced gas mixture. In one embodiment, this gas mixture discharge line is in a fluid connection with an inner outlet cavity of the gas mixer. This inner outlet cavity is arranged in the interior of an outlet-side component of the gas mixer. The outer component encloses this outlet-side component in a fluid-tight manner and can be connected flatly to the outlet-side component. The helical mixing cavity and/or the additional mixing cavity or at least one additional mixing cavity is in a fluid connection with the inner outlet cavity via at least one radial duct, preferably via a plurality of radial ducts.

This embodiment makes it easier in many cases to connect the gas mixture discharge line to the gas mixer in a fluid-tight manner, so that the gas mixture produced flows exclusively into the gas mixture discharge line. The outlet-side component acts quasi as an adapter between the outer component and the helical component of the gas mixer, on the one hand, and the gas mixture discharge line, on the other hand. Both the outer component and the helical component as well as the helical mixing cavity can have, thanks to this adapter, a larger diameter each than the gas mixture discharge line. The outlet-side component may be a rigid component or an elastic component.

In a variant of the embodiment with the outlet-side component, the gas mixer comprises a concentration sensor. This concentration sensor is capable of measuring an indicator of the concentration of a gas, especially of the first gas or of a second gas, in the gas mixture produced, and optionally the respective concentrations of a plurality of gases. The concentration sensor is in a fluid connection with the inner outlet cavity via at least one radial duct. A sample of the gas mixture produced is branched off through this fluid connection and is sent to the concentration sensor and is preferably returned again. In an alternative embodiment, the concentration sensor is in a fluid connection with a mixing cavity.

This embodiment with the concentration sensor makes it easier to measure the actual concentration of a gas in the gas mixture produced and to compare it with a predefined desired concentration. The feed of a gas to the gas mixer can be increased or decreased, and especially the volume flow of this gas can be increased or decreased in case of a great deviation. It is possible thanks to the concentration sensor to regulate the mixing of the two gases, in which case a required value or time course of the concentration of a gas in the gas mixture is predefined. In one application, the concentration sensor is capable of measuring an indicator of the concentration of anesthetic (one or more an anesthetic agent) in the gas mixture.

In another variant of this embodiment, the gas mixer comprises a volume flow sensor. This volume flow sensor is in a fluid connection via at least one radial duct with the inner outlet cavity. The volume flow sensor measures an indicator of the volume that flows through the inner outlet cavity per unit of time. It is also possible that a temperature sensor is in a fluid connection with the inner outlet cavity and measures an indicator of the temperature of the gas mixture, which is flowing through the inner outlet cavity. Thanks to the volume flow sensor, it is possible to regulate the volume flow of the gas mixture, in which case a required time course of the volume flow is predefined. It is made possible thanks to the temperature sensor to regulate the temperature of the gas mixture. In an alternative embodiment, the volume flow sensor or the temperature sensor is in a fluid connection with a mixing cavity.

These variants with the sensors may be combined with one another, so that at least two sensors measure two properties of the gas mixture in the inner outlet cavity.

In one embodiment, the additional mixing cavity or an additional mixing cavity is formed in the interior of the helical component. The helical component consequently encloses this additional mixing cavity. The radial duct or each radial duct between the additional mixing cavity and the helical mixing cavity is passed through the helical component. The outer component encloses these radial ducts and protects them to a certain extent from contamination and other harmful mechanical effects from the outside. The additional mixing cavity preferably has the shape of a column or of a truncated cone with a round or elliptical or polygonal cross-sectional area with n>=3 [edges]. It is also possible that the additional mixing cavity or an additional mixing cavity has the shape of an annular gap, i.e., a cross-sectional area in the form of a circular ring (torus). The embodiment with the additional mixing cavity in the interior of the helical component makes it possible to configure the outer component as a very thin component or as a very compact component.

In another embodiment, the additional mixing cavity or an additional mixing cavity is formed in the interior of the outer component. The radial duct or each radial duct between the additional mixing cavity and the helical mixing cavity is passed through the outer component. This embodiment makes it easier in many cases to establish a fluid connection between a feed line and the additional mixing cavity. The additional mixing cavity in the interior of the outer component preferably has the shape of a tube with an elliptical, especially circular, or polygonal cross section (n>=3 [edges]), but it may also have the shape of a duct or of a ring gap.

It is possible to combine these two embodiments. The gas mixer according to this combination comprises two additional mixing cavities, namely, a first additional mixing cavity in the helical component and a second additional mixing cavity in the outer component. At least one radial component each per additional mixing cavity is passed through the helical component or through the outer component and it connects this additional mixing cavity to the helical mixing cavity.

In one embodiment, the gas mixer extends along a longitudinal axis, wherein this longitudinal axis preferably acts as a central axis of the gas mixer. The helical mixing cavity has an extension along this longitudinal axis. The additional mixing cavity or each additional mixing cavity likewise has an extension along this longitudinal axis. The extension of the outer component is preferably greater than the respective extension of each mixing cavity. In other words, the outer component projects in at least one direction parallel to the longitudinal axis over each mixing cavity. Space is created hereby for at least one adapter, and the adapter or each adapter connects the feed line or discharge line or a respective feed line or discharge line to a mixing cavity in a fluid-tight manner. The outer component also encloses the adapter or each adapter.

In one embodiment, an inlet cavity is formed in the interior of the outer component. This inlet cavity is formed by the inner wall of the outer component, by an outer wall of the helical component and by an outer wall of an inlet-side component. The inlet cavity is in a fluid connection with a mixing cavity, on the one hand, and it is in a fluid connection with a feed line, on the other hand. The inlet cavity acts as an adapter between the feed line and the mixing cavity, on the one hand. On the other hand, the inlet cavity acts in many cases as a buffer storage unit for the first gas or for the second gas.

The present invention pertains, furthermore, to an arrangement with a gas mixer according to the present invention as well as with three gas lines, namely, a first feed line for the first gas, a second feed line for the second gas and a gas mixture discharge line. The first gas flows through the first feed line to the gas mixer, and the second gas flows through the second feed line. The first feed line is in a fluid connection with the one mixing cavity, i.e., with the helical mixing cavity or with the additional mixing cavity or with an additional mixing cavity, so that the second gas flows into this other mixing cavity. A mixing cavity of the gas mixer is in a fluid connection with the gas mixture discharge line. The gas mixture produced is discharged in the gas mixture discharge line.

In one application, the gas mixture according to the present invention or the arrangement according to the present invention is used to supply a ventilator or another medical device with a gas mixture, wherein the gas mixer has produced this gas mixture. The medical device is in a fluid connection with the gas mixture discharge line as well as with a patient-side coupling unit, for example, with a breathing mask or with a tube. The patient-side coupling unit is connected to a patient or can be connected to a patient. It is also possible that the patient-side coupling unit itself acts as a medical device.

The medical device configured as a ventilator carries out a sequence of ventilation strokes, and a quantity of the gas mixture produced is delivered to the patient during each ventilation stroke. A patient, who is ventilated mechanically, is connected to the patient-side coupling unit. The patient-side coupling unit feeds the gas mixture, which the gas mixer has produced, to the patient.

At least one gas, which is fed to the gas mixer, is breathing air, oxygen, nitrous oxide (N2O), helium, NO or anesthetic (one or more anesthetic agent) according to this medical application. In a variant of this embodiment, the ventilator is an anesthesia device, which sedates or anesthetizes the patient at least from time to time. According to this variant, the first gas is a carrier gas, which comprises oxygen, and the second gas is anesthetic or comprises at least one anesthetic agent, or vice versa. According to this application, a patient is sedated or anesthetized by means of the gas mixture produced by the gas mixer. The medical device configured as an anesthesia device preferably maintains a closed ventilation circuit with the patient, so that the risk of anesthetic escaping into the surrounding area is reduced.

It is also possible to use the gas mixture produced for assisting a ventilation of the patient, i.e., to assist his intrinsic breathing activity, without anesthetizing the patient.

According to the present invention, the gas mixer comprises an outer component and a helical component. In one embodiment, these two components are manufactured separately from one another, for example, by injection molding or another casting method or by machining, and they are subsequently assembled. In another embodiment, the entire gas mixer is manufactured as a one-part component, for example, by casting or also by a 3D printer producing the gas mixer or at least one component of the gas mixer. The 3D printer preferably produces both the outer component and the helical component and optionally additional components of the gas mixer. These components are assembled to form the gas mixer according to the present invention. Or else the 3D printer produces the entire gas mixer according to the present invention, preferably in a single operation.

As was just described, the present invention pertains to a gas mixer as well as to an arrangement with such a gas mixer. Furthermore, the present invention pertains to a system, which comprises the arrangement just described with the gas mixer, especially a ventilator. The medical device is configured to supply a patient with a gas mixture, especially to ventilate the patient and optionally to sedate or anesthetize the patient in the process, for example, to carry out an inhalative sedation.

The medical device feeds a gas mixture, which has been produced by the gas mixer according to the present invention, to a patient-side coupling unit, which is connected to the patient. The gas mixture discharge line establishes a fluid connection between the gas mixer and the medical device at least from time to time. In one embodiment, a supply system provides the gases, from which the gas mixer produces the gas mixture, doing so preferably under a respective overpressure. These gases flow through the feed lines to the mixing cavities of the gas mixer. In another embodiment, the medical device sucks in the gas mixture. In another embodiment, which does not require a ventilator, the patient-side coupling unit itself acts as the medical device. The patient sucks in the gas mixture with the patients's own respiratory muscles.

The present invention will be described below on the basis of exemplary embodiments. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
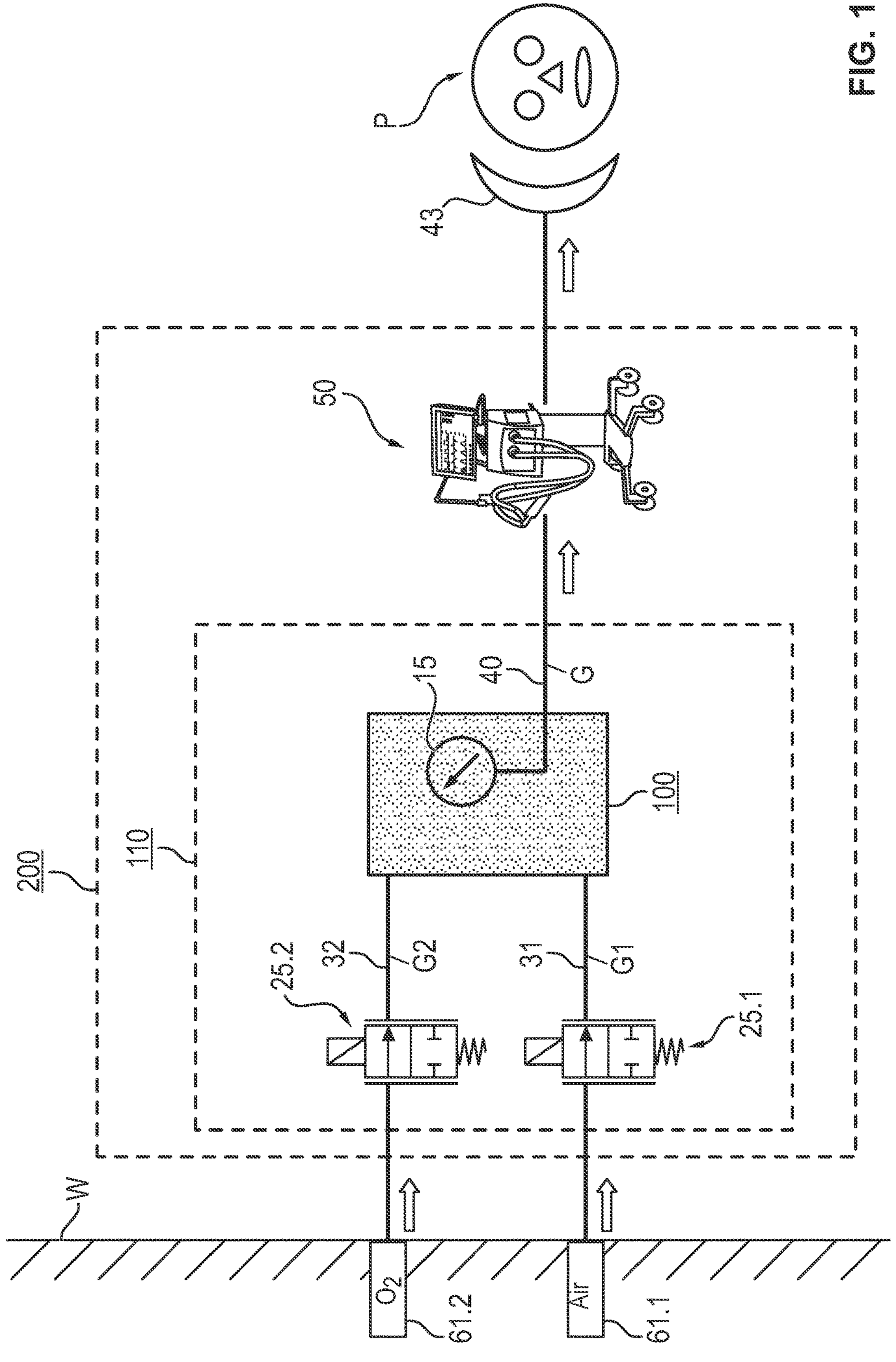
FIG. 1 is a schematic view showing the ventilation of a patient by means of a ventilator.

Referring to the drawings, the present invention is used in the exemplary embodiment in a gas mixer 100 according to the present invention, wherein the gas mixer 100 produces a gas mixture, which is fed to a ventilator. The ventilator ventilates a patient. In one embodiment, the ventilator belongs to a system, which anesthetizes the patient.

FIG. 1 shows schematically how a ventilator 50 ventilates a patient P. The ventilator 50 delivers a quantity of a gas mixture G during each ventilation stroke to a patient-side coupling unit 43, which is connected to the patient P, for example, to a breathing mask on the face or to a tube in the body of the patient P. The gas mixture G consisting of breathing air (acting as the first gas G1) and oxygen (O2, acting as the second gas G2) is produced in the example shown in FIG. 1.

A supply port 61.1 in a wall W provides breathing air under overpressure, and a supply port 61.2 provides oxygen (O2) under overpressure. It is also possible that the first gas G1 and/or the second gas G2 are provided from a compressed air cylinder. A first feed line 31 sends the breathing air G1 from the supply port 61.1 to the gas mixer 100 according to the present invention, and a second feed line 32 sends the oxygen G2 from the supply port 61.2 to the gas mixer 100. A proportional valve or on-off valve 25.1 in the first feed line 31 changes the volume flow of breathing air, and a proportional valve or on-off valve 25.2 in the second feed line 32 changes the volume flow of oxygen. A signal-processing control device (controller), not shown, is preferably capable of actuating the two valves 25.1, 25.2 in order to achieve a respective desired volume flow. The gas mixer 100 produces a gas mixture G from breathing air and oxygen. This gas mixture G flows through a gas mixture discharge line 40 to the ventilator 50 and farther to the patient-side coupling unit 43.

FIG. 1 shows, furthermore, a system 200 for the assisted ventilation of the patient P, wherein the system 200 is in a fluid connection with the patient-side coupling unit 43. The system 200 comprises the ventilator 50, an arrangement 110 comprising the gas mixer 100 and the proportional valves 25.1 and 25.2 as well as a plurality of lines 31, 32, 40.

Figure 2:
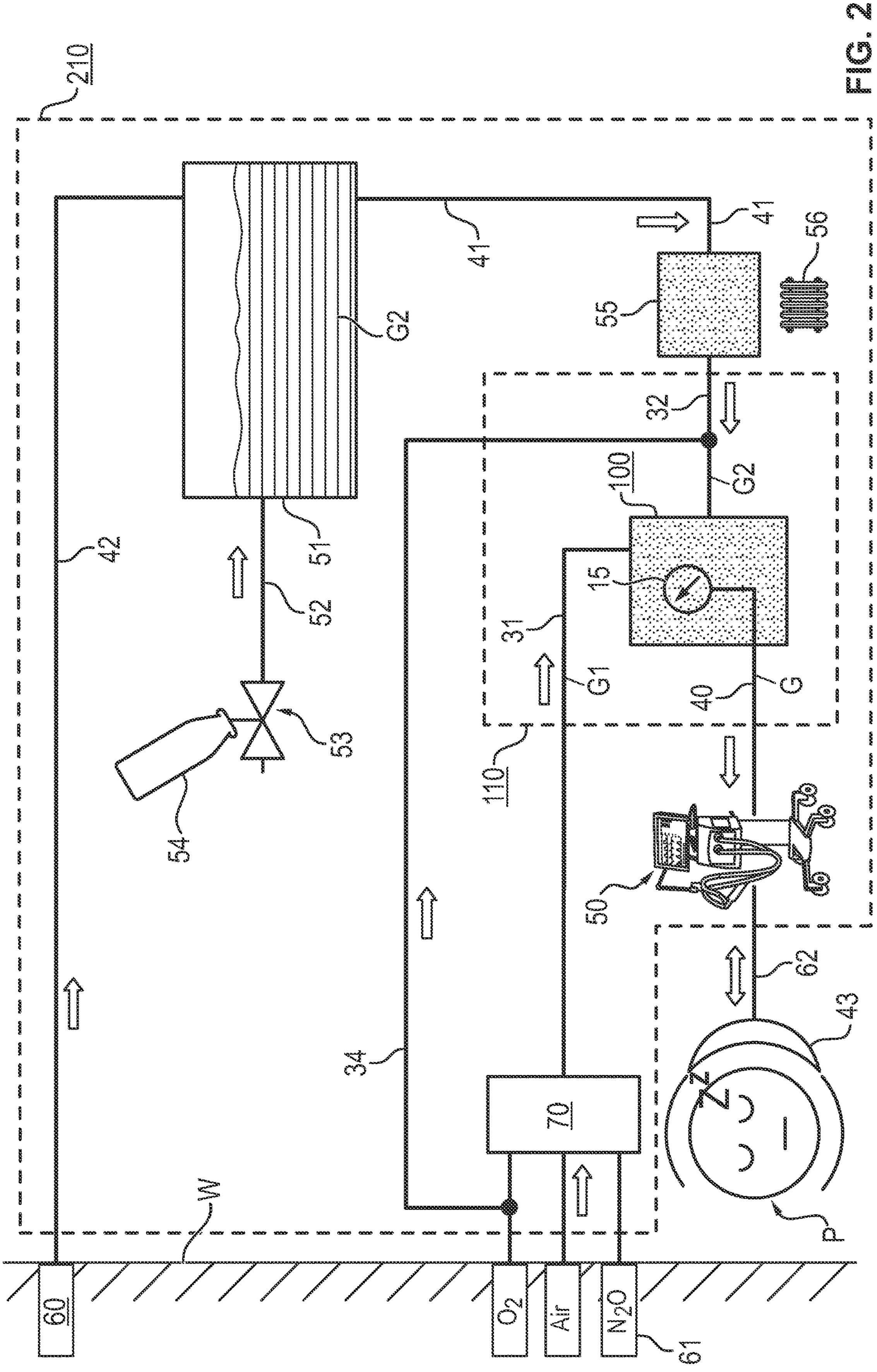
FIG. 2 is a schematic view showing a system for anesthetizing a patient with the use of a ventilator.

FIG. 2 shows an application in which the patient P is not only ventilated, but is additionally also anesthetized. Identical reference numbers have the same meanings as in FIG. 1. A gas is added to a carrier gas, the carrier gas being or containing air, O2 and/or N2O and the added gas being or containing anesthetic (one or more anesthetic agent—or at least one anesthetic agent). The anesthetic is especially an isoflurane, sevoflurane, halothane or desflurane. The added gas may contain an additional component, especially oxygen or breathing air, in addition to anesthetic. This gas mixture of the carrier gas and the gas containing anesthetic is used in the application according to FIG. 2 to anesthetize the patient P.

The carrier gas G1 acts in this application as the first gas, and the gas G2 containing anesthetic acts as the second gas. "Anesthetic" G2 will be referred to below for short. The mixture of the carrier gas G1 and anesthetic G2, which is produced by the gas mixer 100, acts as the produced gas mixture G.

FIG. 2 schematically shows a system 210, which is configured to anesthetize the patient P. Identical reference numbers have the same meaning as in FIG. 1. The ventilator 50 receives from the gas mixer 100 a gas mixture G, which contains oxygen and anesthetic (at least one anesthetic agent). The ventilator 50 carries out a sequence of ventilation strokes and delivers during each ventilation stroke a gas mixture G consisting of the carrier gas G1 with oxygen and the added gas G2 with anesthetic through a gas mixture line arrangement 62 to the patient-side coupling unit 43. A closed patient-side ventilation circuit is established between the patient-side coupling unit 43 and the ventilator 50, and the gas mixture line arrangement 62 comprises a lumen for the inhalation and a lumen for the exhalation. The ventilator 50 keeps the ventilation circuit running in this application by means of a pump, a blower or a piston. The exhaled breathing air flows back to the ventilator 50, and the ventilator 50 processes this breathing air. Since a circuit is established, anesthetic does not escape into the surrounding area.

A gas mixture discharge line 40 sends the gas mixture G from the gas mixer 100 according to the present invention to an anesthesia breathing circuit in the ventilator 50. In one embodiment, the ventilator 50 sucks in the gas mixture G through the gas mixture discharge line 40.

The gas mixer 100 is supplied with the carrier gas G1 by means of a carrier gas feed line 31. A mixer 70 for carrier gas produces the carrier gas G1 from a plurality of components, in the example from oxygen, breathing air and N2O, and it feeds same into the carrier gas feed line 31. It is possible that a valve (not shown) 25.1 changes the volume flow through the carrier gas feed line 31. The carrier gas G1 is preferably under an overpressure relative to the ambient pressure in the carrier gas feed line 31. A supply port 61 in a wall W supplies the carrier gas mixer 70 with the carrier gas components breathing air, O2 and N2O. The carrier gas may, of course, also be composed of additional and/or other components. It is also possible that breathing air is used as carrier gas and no carrier gas mixer 70 is necessary.

The gas mixer 100 is supplied with anesthetic G2 in the gaseous form by means of an anesthetic feed line 32. Gaseous anesthetic G2 is preferably under an overpressure relative to the ambient pressure in the anesthetic feed line 32. It is possible that a valve 25.2 changes the volume flow of anesthetic G2 through the anesthetic feed line 32.

In one embodiment, the anesthetic feed line 32 feeds pure anesthetic to the gas mixer 100. In another embodiment, which is shown schematically in FIG. 2, the anesthetic feed line 32 sends a mixture of anesthetic and pure oxygen to the gas mixture of anesthetic and pure oxygen to the gas mixer 100. A bypass line 34 bypasses the carrier gas mixer 70 and sends the oxygen from the supply port 61 directly to the anesthetic feed line 32.

In the embodiment according to FIG. 2, an anesthetic dispenser 55 with a heater 56 produces gaseous anesthetic G2 from liquid anesthetic G2, which is fed to the anesthetic dispenser 55 via a feed line 41. It is possible that the anesthetic dispenser 55 produces gaseous anesthetic G2 by evaporation or vaporization. It is also possible that the bypass line 34 sends oxygen to the anesthetic dispenser 55 and the anesthetic dispenser 55 feeds gaseous anesthetic into the oxygen.

In addition, FIG. 1 and FIG. 2 schematically show an arrangement 110, which comprises in the example shown a gas mixer 100, the two feed lines 31 and 32 as well as the gas mixture discharge line 40.

It is possible that the gas mixer 100 or the entire arrangement 110 is arranged in the interior of the ventilator 50. The arrangement 110 is shown in FIG. 1 and FIG. 2 for illustration outside of the ventilator 50. The arrangement 110 is a part of the system 200 or 210.

The gas mixer 100 according to the exemplary embodiment is a passive mechanical component, i.e., the gas mixer 100 comprises no component moving during the regular operation and also no component through which electrical current flows. Aside from seals, the gas mixer 100 comprises rigid components.

A desired concentration of oxygen in the gas mixture G is predefined in the exemplary embodiment according to FIG. 1. A concentration sensor 15 shown schematically measures an indicator of the actual concentration of oxygen G2 in the gas mixture G, which is produced by the gas mixer 100. A desired concentration of anesthetic G2 in the gas mixture G is predefined in the exemplary embodiment according to FIG. 2. A concentration sensor 15 shown schematically measures an indicator of the actual concentration of anesthetic G2 in the gas mixture G.

The concentration sensor 15 is arranged downstream of the gas mixer 100 and will be described farther below. In order to reduce a deviation between the desired concentration and the measured actual concentration of a component of the gas mixture G, the volume flow of a gas G1 and/or G2 to the gas mixer 100 can be changed. In one embodiment, a signal-processing control device, not shown, controls at least one of the valves 25.1 or 25.2 or a valve in a line of the anesthesia system 210 in order to change the volume flow of a gas to the gas mixer 100 and hence the composition or the volume flow of the gas mixture G. The control device preferably carries out a regulation with the desired concentration and/or with the desired volume flow as the command variable. The regulation target is to make the actual concentration or the actual volume equal to the desired concentration or to the desired volume flow.

Liquid anesthetic G2 flows from an anesthetic tank 51 into the feed line 41 to the anesthetic dispenser 55. The gas, which is formed in the anesthetic tank 51 above liquid anesthetic G2, is under an overpressure relative to the ambient pressure. A supply port 60 in the wall W feeds compressed air or another gas, which is under an overpressure, into a supply line 42, so that an overpressure is admitted into the anesthetic tank 51 relative to the ambient pressure.

In order to refill liquid anesthetic G2 in the anesthetic tank 51, a cylinder 54 containing liquid anesthetic G2 is attached to a closure 53 in a fluid-tight manner, the closure 53 is opened, and liquid anesthetic G2 flows from the cylinder 54 obliquely downward through the feed line 52 into the anesthetic tank 51.

FIG. 3 through FIG. 6 show a first embodiment of the gas mixer 100 from different viewing directions. The following description pertains to the arrangement according to FIG. 2, in which a gas mixture G comprising anesthetic and a carrier gas is fed to the patient P and the patient P is anesthetized thereby. The gas mixer 100 described below can also be used in a corresponding manner to feed a gas mixture to the ventilator, in which case the ventilator 50 ventilates the patient P with this gas mixture without anesthetizing patient P, i.e., for the assisted ventilation according to FIG. 1. The gas mixer 100 can also be used to provide a gas mixture G, which the patient P inhales by means of his intrinsic respiratory muscles, i.e., without an assisted ventilation.

Figure 3:
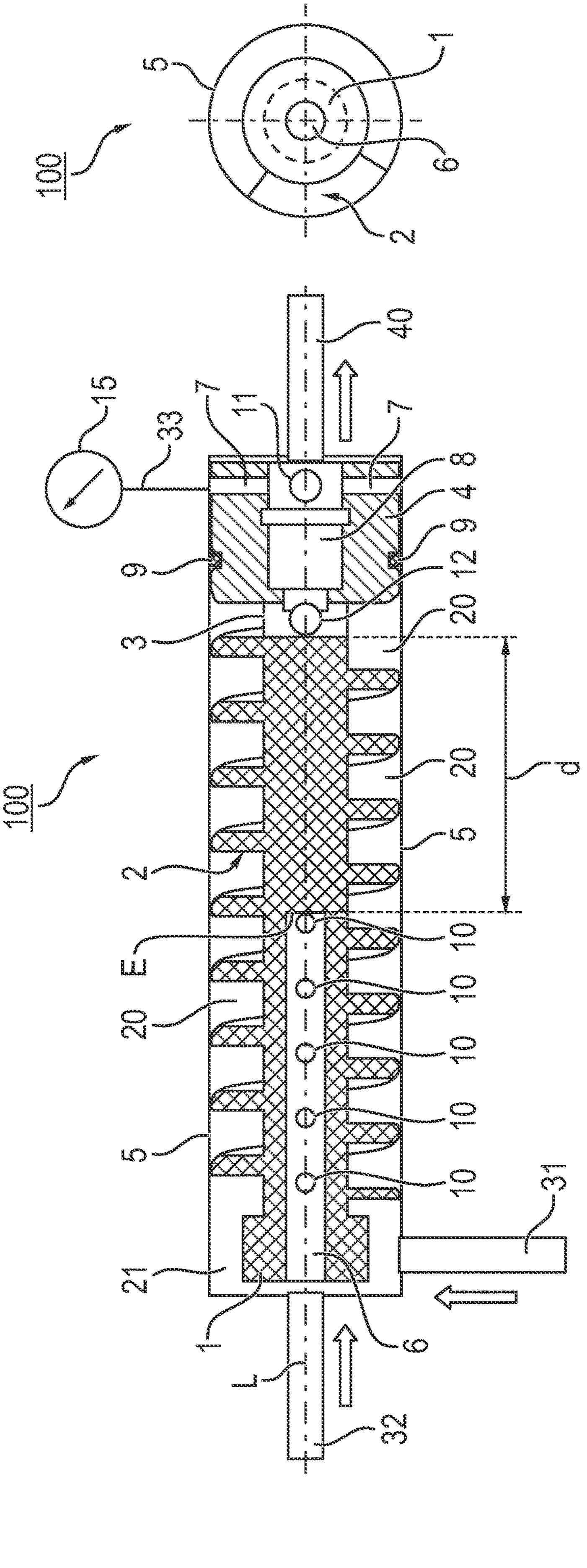
FIG. 3 is a cross-sectional view of the gas mixer according to a first embodiment of the present invention, wherein the longitudinal axis of the gas mixer is located in the drawing plane, as well as a front view, wherein the longitudinal axis is at right angles to the drawing plane.
Figure 4:
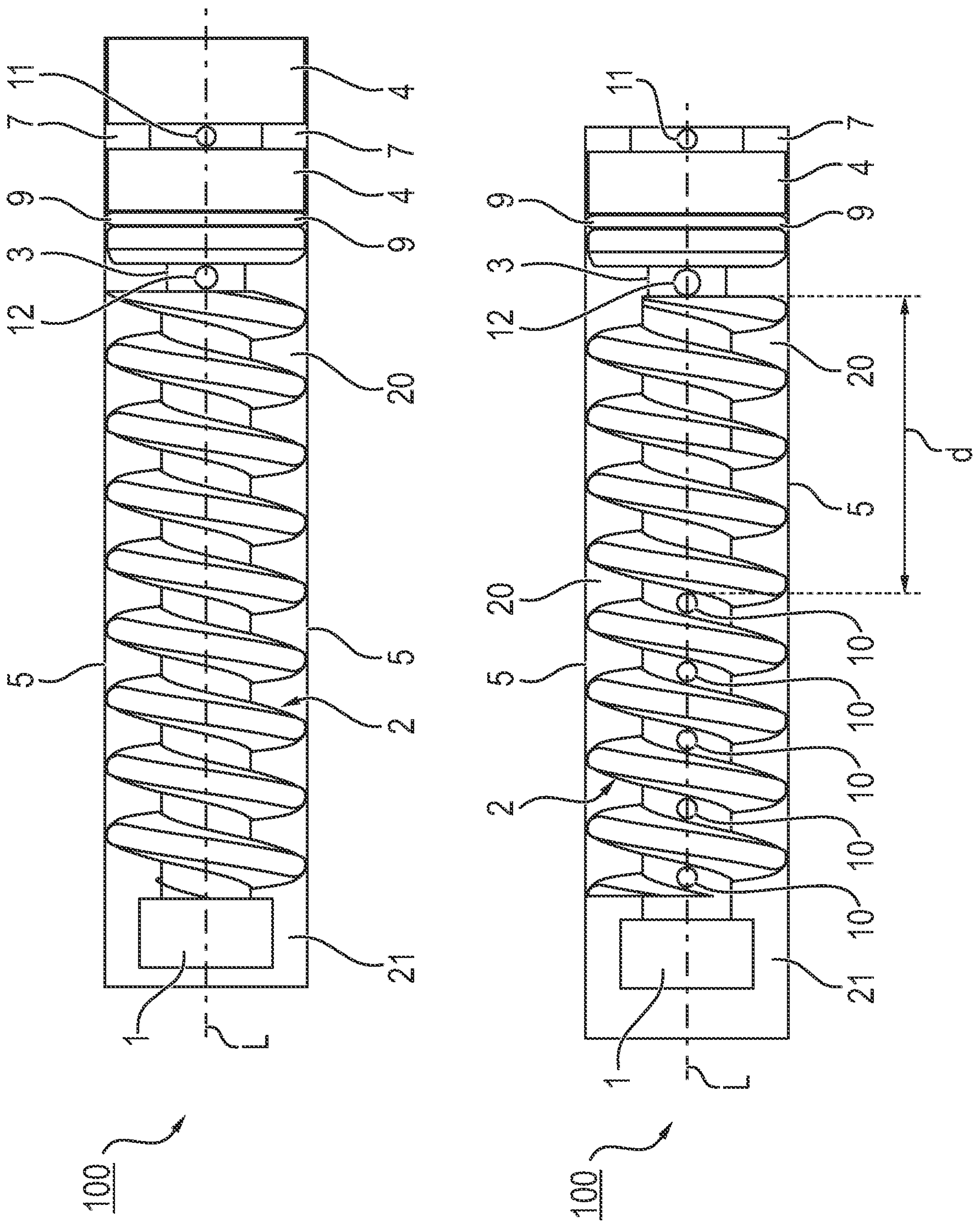
FIG. 4 is a view of the gas mixer according to the first embodiment from one of two mutually opposite viewing directions and another view according to the first embodiment from another of the two mutually opposite viewing directions, wherein the longitudinal axis is located in the drawing plane.
Figure 5:
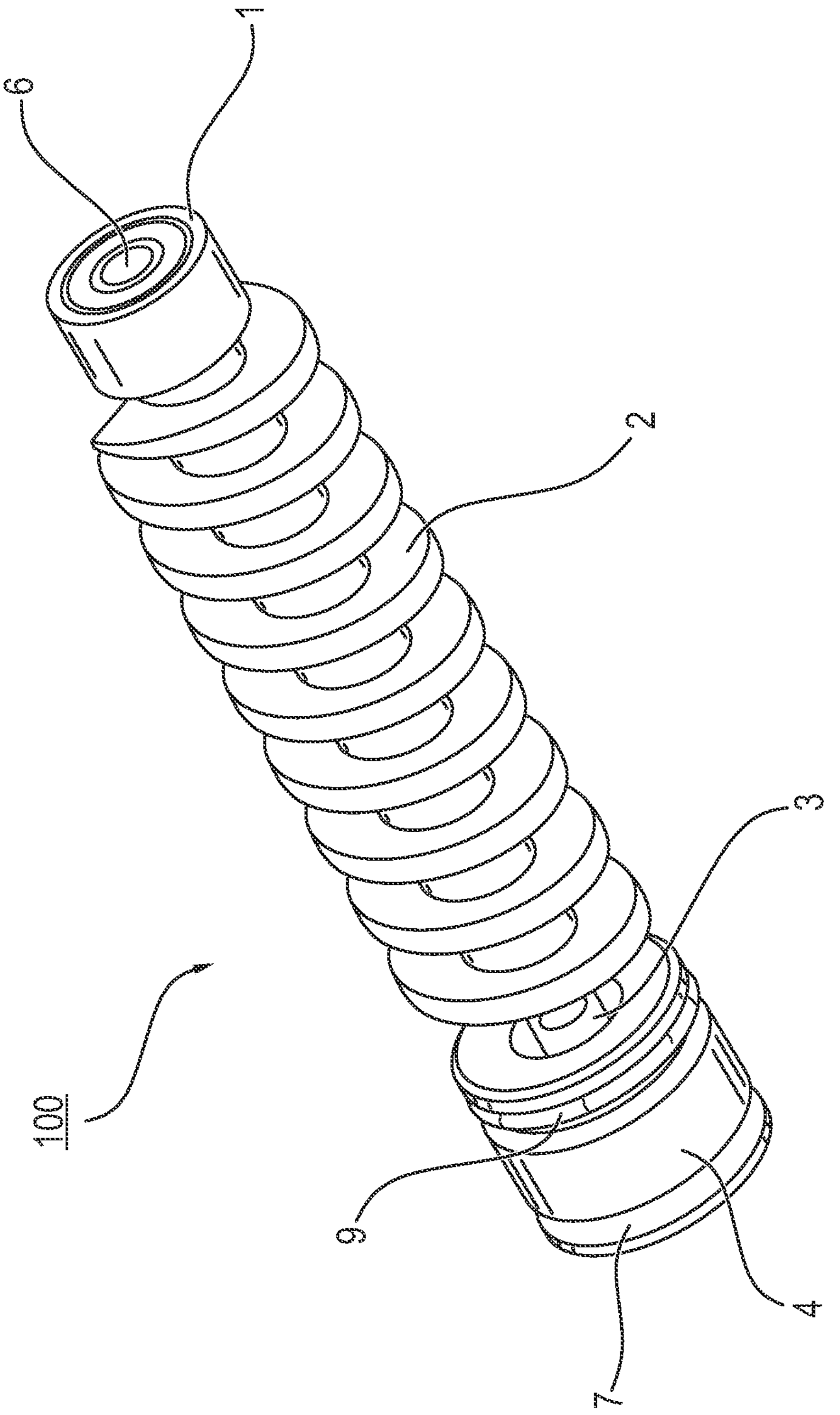
FIG. 5 is a perspective view showing portions of the gas mixer from FIG. 3 and from FIG. 4.
Figure 6:
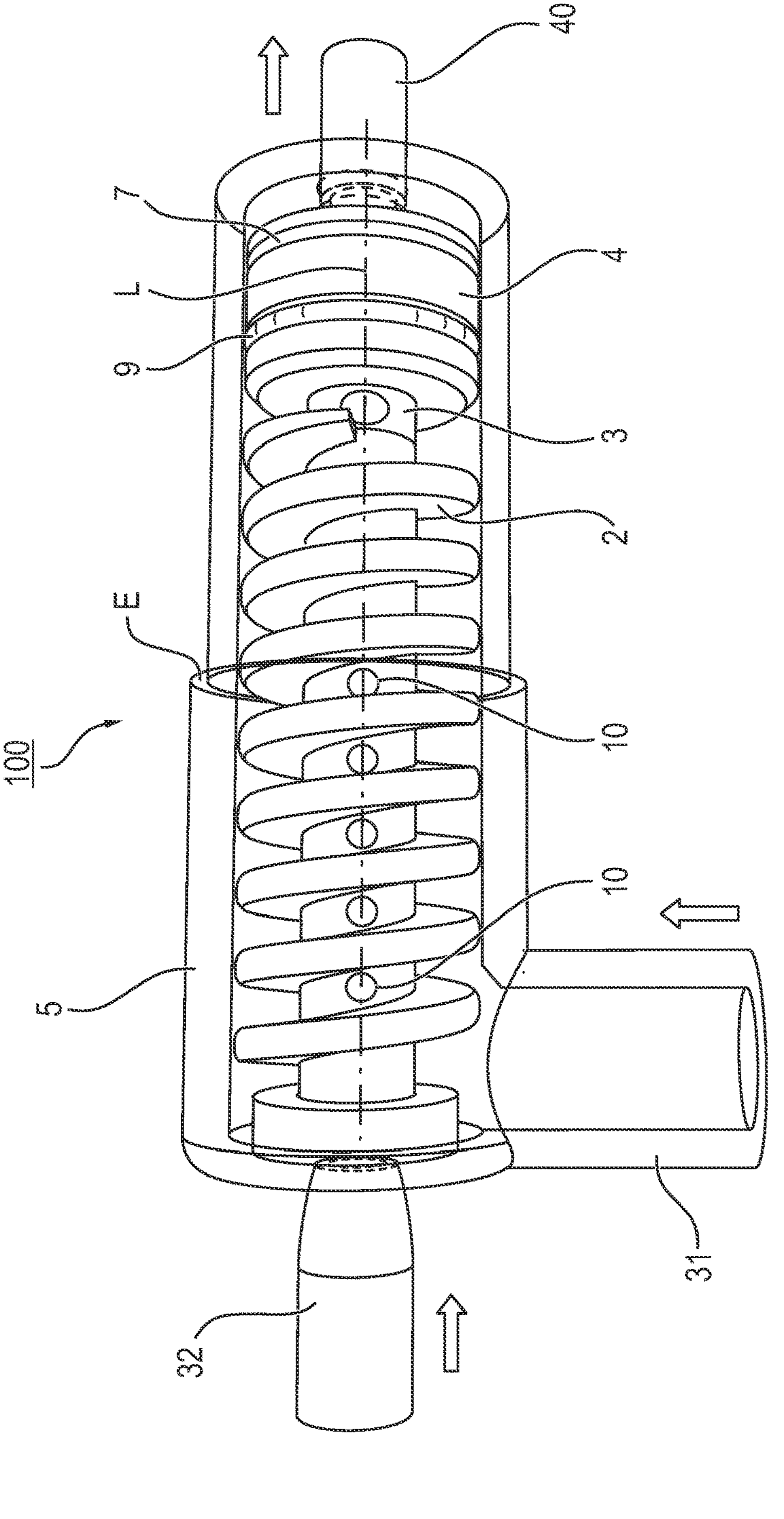
FIG. 6 is a schematic view showing the gas mixer from FIG. 3 through FIG. 5 as well as two feed lines and a discharge line, wherein the longitudinal axes of the gas mixer and of the lines are located in the drawing plane.

The gas mixer 100 has approximately the shape of a cylinder and extends along a longitudinal axis L, which is located in the drawing planes of FIG. 3, FIG. 4 and FIG. 6 and is directed obliquely on the drawing plane of FIG. 5. As can be seen in FIG. 6, the carrier gas G1 is fed to the gas mixer 100 in the exemplary embodiment via the carrier gas feed line 31, which is arranged laterally relative to the longitudinal axis L, and anesthetic G2 is fed via the centrally arranged anesthetic feed line 32. The longitudinal axis of the carrier gas feed line 31 is directed at right angles to the longitudinal axis L of the gas mixer 100. The longitudinal axes of the anesthetic feed line 32 and of the gas mixture discharge line 40 are identical to the longitudinal axis L. The gas mixture G leaves the gas mixer 100 via the centrally arranged gas mixture discharge line 40. A gas sample from the gas mixture G produced is delivered from the gas mixture discharge line 40 to the concentration sensor 15 and is fed again into the gas mixture discharge line 40. This preferably happens continuously.

The gas mixer 100 extends along the longitudinal axis L and comprises the following components, which are arranged—along the longitudinal axis L and seen in a flow direction from the anesthetic feed line 32 to the gas mixture discharge line 40—one after another, i.e., from left to right in FIG. 3 and FIG. 4 and FIG. 6:

a hollow inlet cylinder 1, which acts as the inlet-side component, a hollow screw 2, which acts as the helical component, a neck 3, and a hollow outlet cylinder 4.

The neck 3 and the outlet cylinder 4 act together as the outlet-side component.

Each component 1, 2, 3, 4 as well as each line 31, 32, 40 is manufactured from a respective material that is resistant to each anesthetic agent and/or other gas being considered in the gas mixture. The material or at least one material is, for example, a hard plastic, especially a polyether ether ketone (PEEK) or another Polyaryletherketon (PEAK).

A tubular outer component in the form of a housing 5 encloses these four components 1 through 4. The outer component 5 preferably has a circular or elliptical cross section. The housing 5 is also manufactured from a material that is resistant to each anesthetic agent/other gas being considered as well as to the cleaning agents used in a medical setting. The inner wall of the housing 5 is in contact with the screw 2 in a fluid-tight manner and with the outlet cylinder 4 in a fluid-tight manner. The outside diameter of the inlet cylinder and the outside diameter of the neck 3 are smaller than the internal diameter of the housing 5. A ring-shaped inlet cavity 21, which encloses the inlet cylinder 1 and preferably has a rectangular cross section in a plane extending at right angles to the longitudinal axis L, is therefore formed in the housing 1.

A helical mixing cavity 20 is formed between the circular groove of the screw 2 and the inner wall of the housing 5. This helical mixing cavity 20 extends along a longitudinal axis, which is arranged parallel to the longitudinal axis L of the gas mixer 100, also encloses the neck 3 and is defined by the outlet cylinder 4. No cavity is formed between the housing 5 and the outlet cylinder 4, because the housing 5 is in contact with the outlet cylinder 4 in a fluid-tight manner.

A centrally arranged, additional mixing cavity 6 has the shape of a column, is passed through the entire inlet cylinder 1 and through a part of the screw 2, extends along a longitudinal axis, which is identical or parallel to the longitudinal axis L of the gas mixer 100, and ends in the end E. The column-shaped mixing cavity 6 preferably has the shape of a round or elliptical cylinder or truncated cone, but it may also have a polygonal cross-sectional area with n>=3 [sides]. A distance d occurs between the end E and the neck 3. The column-shaped mixing cavity 6 preferably encloses an area of the screw 2, whose length equals between 40% and 90%, especially preferably between 60% and 70%, of the total length of the screw 2 along the longitudinal axis L. The anesthetic feed line 32 opens into this mixing cavity 6 in a fluid-tight manner and axially.

An outlet cavity 8, which preferably has the shape of a column, is passed through the neck 3 and the entire outlet cylinder 4. This outlet cavity 8 opens into the gas mixture discharge line 40 in a fluid-tight manner. The screw 2 blocks the direct path from the additional mixing cavity 6 to the outlet cavity 8.

The two cylinders 1 and 4, the neck 3 and the two cavities 6 and 8 are positioned rotationally symmetrically to the longitudinal axis L of the gas mixer 100. The screw 2 is arranged around this longitudinal axis L. The central axis of the screw 2 is preferably identical to the longitudinal axis L.

A ring-shaped gap 7 is recessed into the outer wall of the outlet cylinder 4 and forms a gas sample cavity. A line 33, which leads to the concentration sensor 15, is connected to this gap 7. In addition, a circular groove is recessed in the outer wall of the outlet cylinder 4 for a sealing ring 9.

A plurality of radial ducts 10 in the screw 2 connect the column-shaped mixing cavity 6 to the helical mixing cavity 20. The radial duct 10, which is the last duct when viewed in the flow direction, adjoins the end E of the additional mixing cavity 6, so that no dead space is formed in the column-shaped mixing cavity 6. A plurality of radial ducts (inner outlet cavity radial ducts) 12 in the neck 3 connect the column-shaped mixing cavity 6 to the outlet cavity 8. The ducts 12 have larger cross-sectional areas than do the ducts 10, and each duct 12 with its cross-sectional area preferably occupies the total length of the neck 3 along the longitudinal axis L, so that no dead space is formed in the outlet cylinder 4. The two cavities 6 and 8 are in a fluid connection with one another via the ducts 10 and 12 as well as via the helical mixing cavity 20.

A plurality of radial ducts (sample cavity radial ducts) 11 in the outlet cylinder 4 connect the outlet cavity 8 to the ring-shaped gap 7. As a result, the concentration sensor 15 is in a fluid connection with the outlet cavity 8, through which the gas mixture G flows.

An angle between 80° and 100° and especially preferably a right angle is preferably formed between the longitudinal axis l of the gas mixer 100 and the radial ducts 10, 11, 12.

Both the carrier gas G1 and anesthetic G2 are under an overpressure relative to the ambient pressure in the exemplary embodiment and they flow as a result to the gas mixer 100.

The carrier gas G1 flows through the laterally arranged carrier gas feed line 31 into the inlet cavity 21 and from there into the helical mixing cavity 20. The screw 2 and the housing 5 force the carrier gas G1 to move along a helical path through the helical mixing cavity 20, and this path ends at a front wall of the outlet cylinder 4. Anesthetic G2 flows through the centrally arranged feed line 32 into the column-shaped mixing cavity 6.

Figure 7:
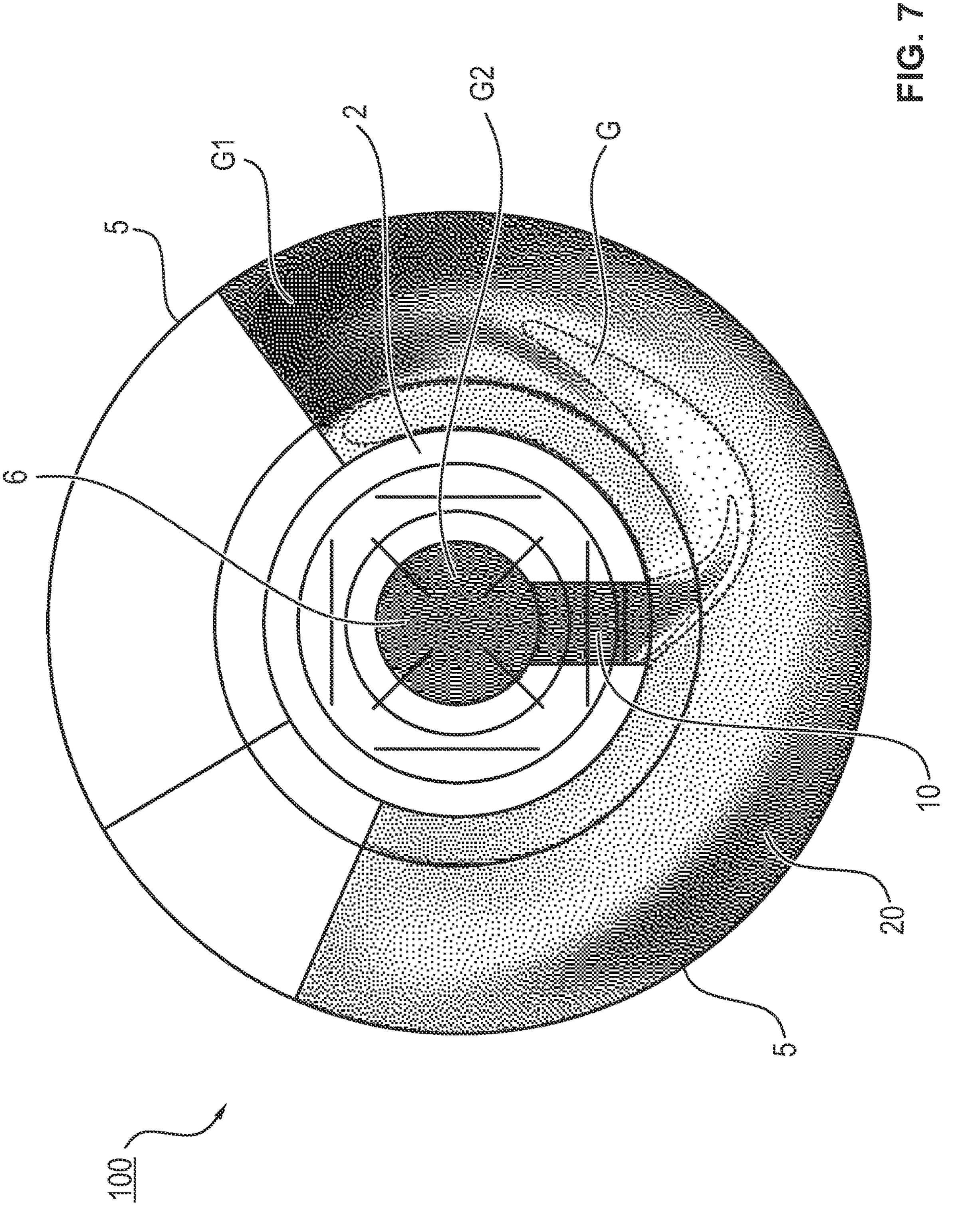
FIG. 7 is a cross- sectional view of an example of two gases being mixed in the helical mixing cavity between the helical component (screw) and the housing if gas 2 is under a higher pressure than gas 1.
Figure 8:
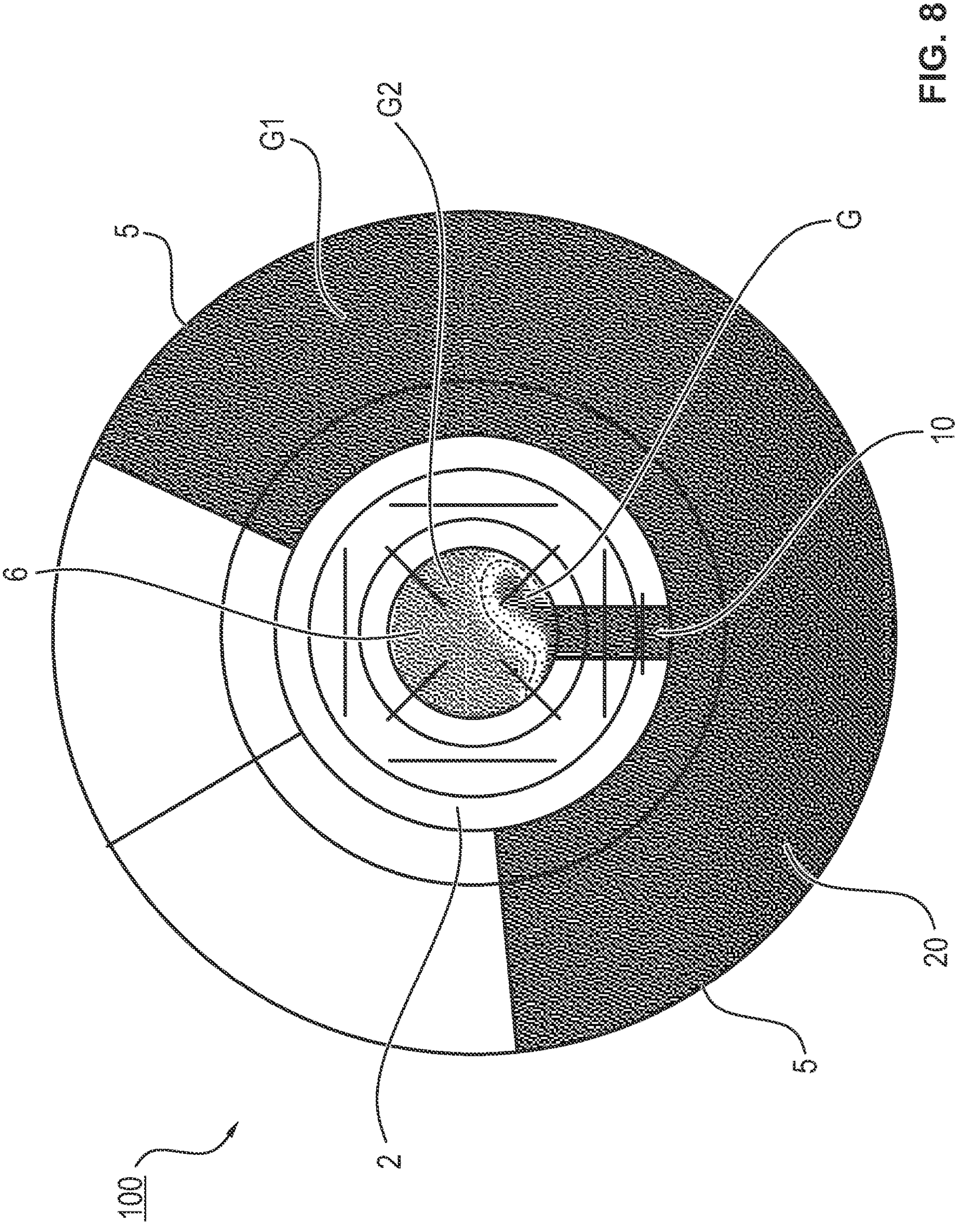
FIG. 8 is a cross-sectional view of an example of two gases being mixed in the additional mixing cavity in the screw if gas 1 is under a higher pressure than gas 2.

FIG. 7 and FIG. 8 illustrate as an example how the two gases G1 and G2 are mixed with one another in the interior of the gas mixer 100. The longitudinal axis L is at right angles to the drawing planes of FIG. 7 and FIG. 8.

In the example according to FIG. 7, anesthetic G2 is under a higher pressure than the carrier gas G1. Anesthetic G2 therefore flows from the column-shaped mixing cavity 6 through the radial ducts 10 and into the helical mixing cavity 20. The two gases G1 and G2 are mixed with one another in the helical mixing cavity 20 and form the gas mixture G there. Since the outlet cylinder 4 defines the cavity 20, the gas mixture G is pressed through the ducts 12 into the outlet cavity 8. The gas mixture G flows from the outlet cylinder 8 into the gas mixture discharge line 40.

By contrast, the carrier gas G1 is under a higher pressure than anesthetic G2 in the example according to FIG. 8. The carrier gas G1 flows therefore from the helical mixing cavity 20 through the radial ducts 10 and into the column-shaped mixing cavity 6. The two gases G1 and G2 are mixed with one another in the column-shaped mixing cavity 6 and form a gas mixture G there. The pressure in the column-shaped mixing cavity 6 rises, and the gas mixture G leaves again the additional mixing cavity 6 through radial ducts 10 and flows into the helical mixing cavity 20. The further path of the gas mixture G is the same as that described with reference to FIG. 7.

A small portion of the gas mixture G flows through radial ducts 11 into the ring-shaped gap 7 and from there to the concentration sensor 15 through the line 33. This sensor 15 measures an indicator of the actual concentration of anesthetic G2 in the gas mixture G. The quantity of the gas mixture G that was branched off as a gas sample through the ducts 11 and was sent to the concentration sensor 15 is preferably fed later again to the rest of the gas mixture G.

An angle, which is between 80° and 100°, is preferably formed between each duct 10, 11, 12 and the longitudinal axis L of the gas mixer 100. A gas G1, G2, G is therefore deflected by an angle of at most 100° when it flows through the gas mixer 100. A right angle each is formed especially preferably between each duct 10, 11, 12 and the longitudinal axis L, and the gas G1, G2, G is deflected by a right angle at the maximum.

The positions of the ducts 10 and 12 ensure in the exemplary embodiments that a dead space will not be formed either in a mixing cavity 6, 20 or in the inlet cavity 6. Such a dead space in a cavity is undesirable since gas can collect in a dead space and is not moved further as a gas outside of the dead space at all or is moved only more slowly. This could lead to a relatively poor mixing quality. The respective overpressure, under which the carrier gas G1 in the carrier gas feed line 31 and anesthetic G2 in the anesthetic feed line 32 are, as well as the construction of the gas mixer 100 do rather keep the two gases G1 and G2 as well as the gas mixture G in the gas mixer 100 steadily in motion, while the gas mixer 100 is being used. It is especially due to this fact that the gas mixer 100 according to the exemplary embodiment has achieved a mixing quality above 98% in in-house tests. "Mixing quality" is defined as the minimum and mean concentration or the quotient of the mean concentration and the maximum concentration of anesthetic G2 in the gas mixture G at a given time.

Figure 9:
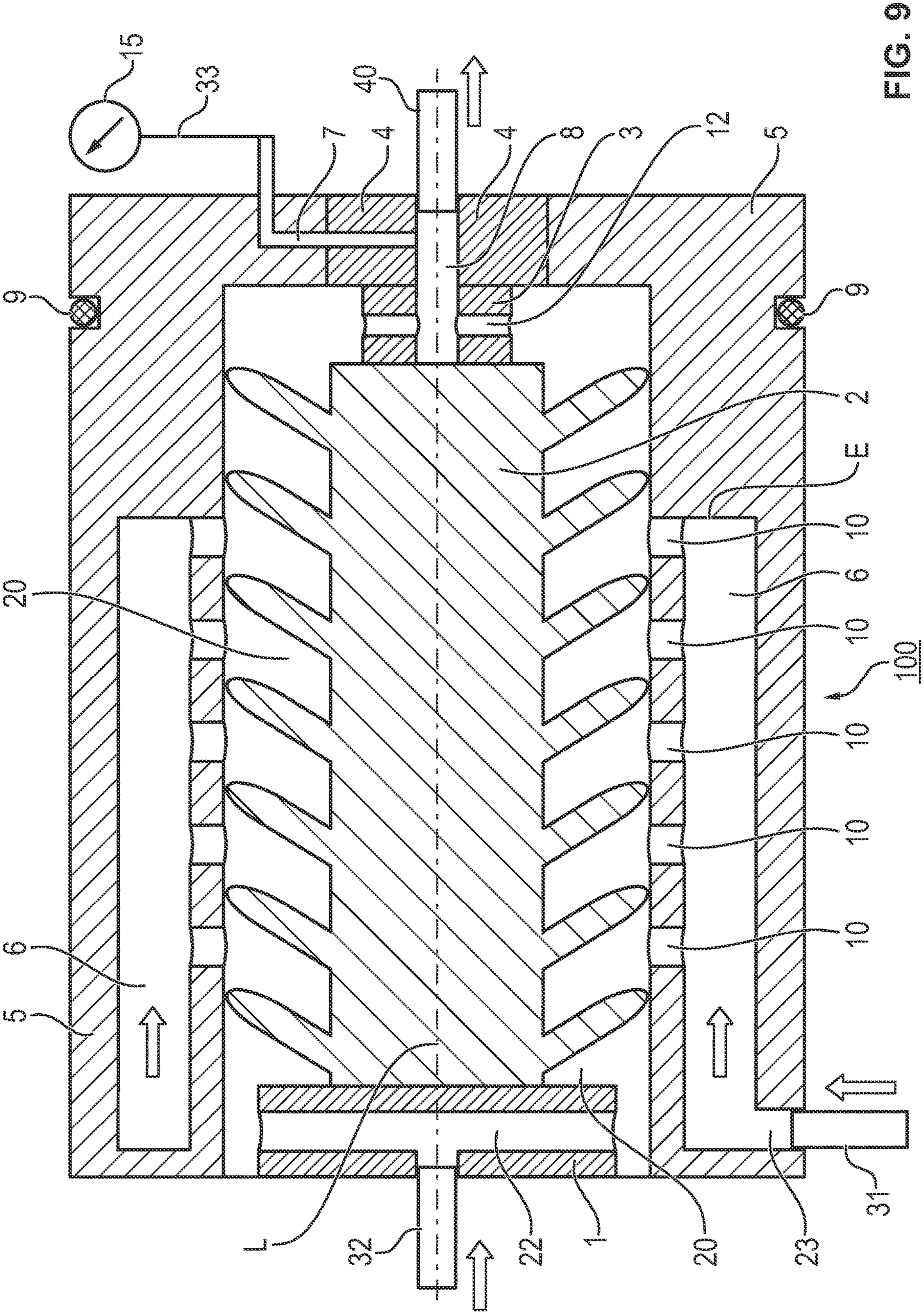
FIG. 9 is a cross-sectional side view showing a second embodiment of the gas mixer.

FIG. 9 shows a second embodiment of the gas mixer 100 according to the present invention. Identical reference numbers have the same meaning as in FIG. 3 through FIG. 8.

Contrary to the first embodiment, the additional mixing cavity 6 is arranged in the second embodiment in the interior of the tubular outer component 5 rather than in the interior of the screw 2. The outer component 5 is therefore thicker in the second embodiment than in the first embodiment. The screw 2 is configured in the second embodiment as a massive component, i.e., it has no cavity in the interior. The extension of the additional mixing cavity 6 is also smaller in the second embodiment than is the extension of the screw 2 or of the outer component 5. The additional mixing cavity 6 preferably has the shape of a centered tube in the second embodiment, and this tube encloses the screw 2 and the longitudinal axis of the tube is identical to the longitudinal axis L of the gas mixer 100. The additional mixing cavity 6 may, however, also have the shape of a laterally offset column or of a laterally offset tube, i.e., it cannot enclose the screw 2. The longitudinal axis of the additional mixing cavity 6 is parallel to the longitudinal axis L and is located at a spaced location from same in this embodiment.

If the additional mixing cavity 6 is oriented as a centered tube, an inlet cavity 23 in the form of a ring gap connects the carrier gas feed line 31 to the additional mixing cavity 6. If the additional mixing cavity 6 is configured as a column or as a laterally offset tube, the carrier gas feed line 31 may open directly into the additional mixing cavity 6. An inlet cavity 22 connects the anesthetic feed line 32 to the helical mixing cavity 20.

In the second embodiment according to FIG. 9, the carrier gas G1 is consequently sent into the additional mixing cavity 6, and anesthetic G2 into the helical mixing cavity 20. Just as in the first embodiment, a plurality of radial ducts 10 connect the additional mixing cavity 6 to the helical mixing cavity 20.

Figure 10:
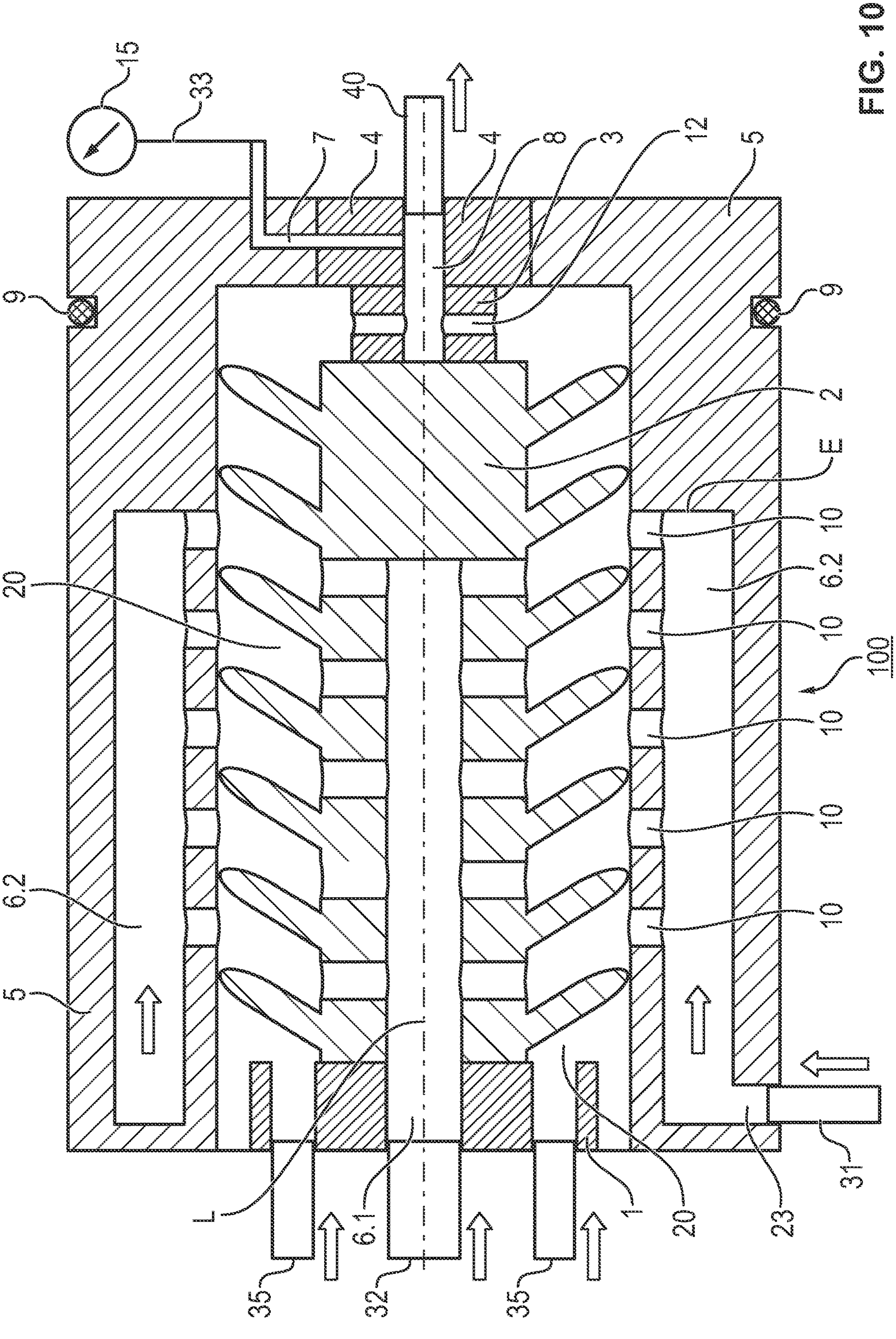
FIG. 10 is a cross-sectional side view showing a third embodiment, which combines aspects of the first embodiment and the second embodiment.

FIG. 10 shows a third embodiment, which is a combination of the first embodiment with the second embodiment. The gas mixer 100 according to FIG. 10 is capable of forming a gas mixture from three fed gases, for example, from

- a carrier gas, which is fed through the carrier gas feed line 31,
- anesthetic (one or more anesthetic agent), which is fed via the anesthetic feed line 32, and
- pure oxygen, which is fed via at least one additional feed line 35.

It is also possible that the carrier gas or the same anesthetic or another anesthetic is fed via the additional feed line 35.

The gas mixer 100 according to the third embodiment comprises two additional mixing cavities, namely, both a column-shaped mixing cavity 6.1 in the interior of the screw 2 and a tubular mixing cavity 6.2 in the interior of the tubular outer component 5. The tubular mixing cavity 6.2 encloses the hollow screw 2. The two mixing cavities 6.1 and 6.2 are two additional mixing cavities. Just as in the first embodiment, the anesthetic feed line 32 leads into the column-shaped mixing cavity 6.1. Just as in the second embodiment, the carrier gas feed line 31 leads into the tubular mixing cavity 6.2. The additional feed line or each additional feed line 35 opens into the helical mixing cavity 20.

While specific embodiments of the invention have been shown and described in detail to illustrate the application of the principles of the invention, it will be understood that the invention may be embodied otherwise without departing from such principles.

LIST OF REFERENCE NUMBERS

1 Inlet cylinder; it encloses the tubular additional mixing cavity 6; enclosed by the ring-shaped inlet cavity 21

2 Screw; it encloses the inlet cavity 6, has the radial ducts 10, acts as the helical component

3 Neck between the screw 2 and the outlet cylinder 4; it has the radial ducts 12, belongs to the outlet-side component

4 Outlet cylinder; it encloses the outlet cavity 8, has the radial ducts 11, belongs to the outlet-side component

5 Tubular outer component, in the form of a housing in the first embodiment, encloses the additional mixing cavity 6 in the second embodiment and encloses the additional mixing cavity 6.2 in the third embodiment, encloses the inlet cylinder 1 and the neck 3

6 Additional mixing cavity, enclosed by the inlet cylinder 1 and by the screw 2 or by the outer component 5; it ends at the end E

7 Ring-shaped gap in the outlet cylinder 4

8 Outlet cavity, enclosed by the outlet cylinder 4

9 Sealing ring, arranged in a circular groove in the outer wall of the outlet cylinder

10 Radial ducts in the screw 2; they connect the additional mixing cavity 6 or 6.2 to the cavity 20

11 Radial ducts in the outlet cylinder 4; they connect the outlet cavity 8 to the ring-shaped gap 7

12 Radial ducts in the neck 3; they connect the helical mixing cavity 20 to the outlet cavity 8

15 Sensor, which measures the concentration of anesthetic G2 in the gas mixture G

20 Helical mixing cavity between the circumferential groove of the screw 2 and the housing 5, connected through the radial ducts 10 to the additional mixing cavity 6 or 6.2, enclosed by the outer component 5 in a fluid-tight manner

21 Ring-shaped inlet cavity; it connects the carrier gas feed line 31 to the helical mixing cavity 20 in the first embodiment

22 Inlet cavity; it connects the anesthetic feed line 32 to the helical mixing cavity 20 in the second embodiment

23 Ring-shaped inlet cavity; it connects the carrier gas feed line 31 to the additional mixing cavity 6 in the second embodiment and to the additional mixing cavity 6.2 in the third embodiment

25.1 Actuated proportional valve in the first feed line 31

25.2 Actuated proportional valve in the second feed line 32

31 First feed line for the first G1 (breathing air or carrier gas); it opens into the ring-shaped inlet cavity 21 or 23

32 Second feed line for the second gas G2 (oxygen or anesthetic); it opens into the inner mixing cavity 6

33 Line from the ring-shaped gap 7 to the concentration sensor 15

34 Optional bypass line for oxygen; it bypasses the carrier gas mixer 70; opens into the anesthetic feed line 32

35 Additional feed line; it opens into the helical mixing cavity 20 in the third embodiment

40 Gas mixture discharge line; it sends the mixture of gas 1 and gas 2 to the ventilator 50

41 Feed line for liquid anesthetic G2; it leads from the anesthetic tank 51 to the anesthetic dispenser 55

42 Feed line for compressed air; it leads from the compressed air port 60 to the anesthetic tank 51

43 Patient-side coupling unit, connected to the ventilator 50 by means of the gas mixture line arrangement 62

50 Ventilator; it receives the gas mixture G through the gas mixture discharge line 40, carries out ventilation strokes, delivers the gas mixture G through the gas mixture line arrangement 62 to the patient-side coupling unit 43

51 Anesthetic tank; it contains anesthetic G2 in the liquid form; connected to the gas mixer 100 via the feed line 32

52 Feed line for gaseous anesthetic; it opens into the anesthetic tank 51

53 Closure for the feed line 52

54 Cylinder containing liquid anesthetic

55 Anesthetic dispenser; it evaporates or vaporizes liquid anesthetic G2 and feeds gaseous anesthetic into the feed line 32

56 Heater for the anesthetic dispenser 55

60 Supply port for compressed air in the wall W

61 Supply port for the components of the carrier gas G1 in the wall W; it supplies the carrier gas mixer 70

61.1 Supply port in the wall W for pressurized breathing air

61.2 Supply port in the wall W for pressurized oxygen

62 Gas mixture line arrangement from the ventilator 50 to the patient P; it delivers the gas mixture G to the patient P

70 Mixer for carrier gas; it produces the carrier gas G1 and feeds it into the carrier gas feed line 31

100 Gas mixer according to the present invention; it receives a carrier gas G1 from the carrier gas feed line 31 and anesthetic G2 from the anesthetic feed line 32 and it optionally feeds a third gas from the feed line 35; it sends a gas mixture G into the gas mixture discharge line 40

110 Arrangement comprising the gas mixer 100, the feed lines 31 and 32, the gas mixture discharge line 40 and the proportional valves 25.1 and 25.2

200 System for the assisted ventilation of the patient P; it comprises the ventilator 50 and the arrangement 110

210 System for anesthetizing the patient P; it comprises the ventilator 50, the anesthetic dispenser 55, the anesthetic tank 51, the carrier gas mixer 70 and the arrangement 110

D Distance between the end E and the neck 3

E End of the additional mixing cavity 6 in the screw 2

G Gas mixture consisting of gas 1 and gas 2; produced by the gas mixer 100; it flows through the gas mixture discharge line 40

G1 Gas 1: Breathing air or carrier gas

G2 Gas 2: Oxygen or anesthetic

L Longitudinal axis of the gas mixer 100

P Patient, who is ventilated by the ventilator 50 and is optionally anesthetized; connected to the patient-side coupling unit 43

W Wall; it has the supply ports 60 and 61

What is claimed is:

1. A gas mixer configured to mix a first gas and a second gas to form a gas mixture, the gas mixer comprising:

an outer component;

a helical component located in an interior of the outer component, an outer circumference of the helical component being in fluid-tight contact with an inner wall of the outer component;

a helical mixing cavity formed between the outer component and the helical component;

an additional mixing cavity formed in an interior of the helical component or in the interior of the outer component or in both the interior of the helical component and the interior of the outer component;

a radial duct connecting the additional mixing cavity to the helical mixing cavity;

a helical mixing cavity fluid connection of the helical mixing cavity with one of a feed line for the first gas and a feed line for the second gas;

an additional mixing cavity fluid connection of the additional mixing cavity with the other one of the feed line for the first gas and the feed line for the second gas;

a discharge fluid connection of the helical mixing cavity or the additional mixing cavity with a gas mixture discharge line for discharging the formed gas mixture;

an outlet-side component;

an inner outlet cavity in an interior of the outlet-side component, wherein the outer component fluid-tightly encloses the outlet-side component;

an inner outlet cavity fluid connection of the inner outlet cavity with the gas mixture discharge line;

an inner outlet cavity radial duct connecting the helical mixing cavity or the additional mixing cavity to the inner outlet cavity;

a gas sample cavity formed between the outer component and the outlet-side component;

a sample cavity radial duct connecting the inner outlet cavity to the gas sample cavity;

a sensor for testing the formed gas mixture; and a gas sample cavity fluid connection of the gas sample cavity with the sensor.

2. The gas mixer in accordance with claim 1, wherein:

the sensor comprises a concentration sensor configured to measure an indicator for a concentration of a gas in a gas mixture in the inner outlet cavity; or the sensor comprises a volume flow sensor configured to measure an indicator for a volume per unit of time of a gas mixture, which flows through the inner outlet cavity; or the sensor comprises a temperature sensor configured to measure an indicator for a temperature of a gas mixture in the inner outlet cavity; or the sensor comprises any combination of a concentration sensor configured to measure an indicator for a concentration of a gas in a gas mixture in the inner outlet cavity, and a volume flow sensor configured to measure an indicator for a volume per unit of time of a gas mixture, which flows through the inner outlet cavity, and a temperature sensor configured to measure an indicator for a temperature of a gas mixture in the inner outlet cavity.

3. The gas mixer in accordance with claim 1, wherein the additional mixing cavity is formed in the interior of the helical component.

4. The gas mixer in accordance with claim 1, wherein the additional mixing cavity is formed in the interior of the outer component.

5. The gas mixer in accordance with claim 1, further comprising a further additional mixing cavity, wherein:

the additional mixing cavity is a first additional mixing cavity and the further additional mixing cavity is a second additional mixing cavity;

the first additional mixing cavity is formed in the interior of the helical component; and the second additional mixing cavity is formed in the interior of the outer component.

6. The gas mixer in accordance with claim 1, wherein:

the gas mixer extends along a longitudinal axis; and an extension of the helical mixing cavity or an extension of the additional mixing cavity or the extension of the helical mixing cavity and the extension of the additional mixing cavity is smaller than an extension of the outer component along the longitudinal axis of the gas mixer.

7. The gas mixer in accordance with claim 1, further comprising:

an inlet-side component;

an inlet cavity formed between the inner wall of the outer component, the inlet-side component, and the helical component;

a first inlet cavity fluid connection of the inlet cavity with the helical mixing cavity or with the additional mixing cavity or with both the helical mixing cavity and with the additional mixing cavity; and a second inlet cavity fluid connection of the inlet cavity with the feed line for the first gas or with the feed line for the second gas.

8. An arrangement comprising:

a first feed line configured to feed a first gas;

a second feed line configured to feed a second gas;

a gas mixture discharge line to discharge a gas mixture;

a gas mixer configured to mix the first gas and the second gas to form the gas mixture, the gas mixer comprising:

an outer component;

a helical component located in an interior of the outer component, an outer circumference of the helical component being in fluid-tight contact with an inner wall of the outer component;

a helical mixing cavity formed between the outer component and the helical component;

an additional mixing cavity formed in an interior of the helical component or in the interior of the outer component or in both the interior of the helical component and the interior of the outer component;

a radial duct connecting the additional mixing cavity to the helical mixing cavity;

a helical mixing cavity fluid connection of the helical mixing cavity with the feed line for the first gas;

an additional mixing cavity fluid connection of the additional mixing cavity with the feed line for the second gas;

a discharge fluid connection of the helical mixing cavity or the additional mixing cavity with the gas mixture discharge line for discharging the formed gas mixture;

an outlet-side component;

an inner outlet cavity in an interior of the outlet-side component, wherein the outer component fluid-tightly encloses the outlet-side component;

an inner outlet cavity fluid connection of the inner outlet cavity with the gas mixture discharge line;

an inner outlet cavity radial duct connecting the helical mixing cavity or the additional mixing cavity to the inner outlet cavity;

a gas sample cavity formed between the outer component and the outlet-side component;

a sample cavity radial duct connecting the inner outlet cavity to the gas sample cavity;

a sensor for testing the formed gas mixture; and a gas sample cavity fluid connection of the gas sample cavity with the sensor.

9. The arrangement in accordance with claim 8, in combination with a medical device to provide a system for ventilation of a patient, wherein the medical device is configured to feed the gas mixture formed by the gas mixer to a patient-side coupling unit connected to the patient;

the gas mixture discharge line establishes a fluid connection to the medical device;

the arrangement is configured to deliver the first gas to the gas mixer through the first feed line and to deliver the second gas to the gas mixer through the second feed line;

the gas mixer is configured to mix the delivered first gas and the delivered second gas to form the gas mixture; and the arrangement or a delivery unit of the medical device is configured to deliver the gas mixture formed by the gas mixer through the gas mixture discharge line to the medical device.

10. The arrangement in accordance with claim 9, wherein:

the first gas is a carrier gas;

the second gas comprises an anesthetic; and the medical device is configured to feed the gas mixture to the patient to anesthetize the patient.

11. The arrangement in accordance with claim 9, wherein:

the sensor comprises a concentration sensor configured to measure an indicator for a concentration of a gas in a gas mixture in the inner outlet cavity; or the sensor comprises a volume flow sensor configured to measure an indicator for a volume per unit of time of a gas mixture, which flows through the inner outlet cavity; or the sensor comprises a temperature sensor configured to measure an indicator for a temperature of a gas mixture in the inner outlet cavity; or the sensor comprises any combination of a concentration sensor configured to measure an indicator for a concentration of a gas in a gas mixture in the inner outlet cavity, and a volume flow sensor configured to measure an indicator for a volume per unit of time of a gas mixture, which flows through the inner outlet cavity, and a temperature sensor configured to measure an indicator for a temperature of a gas mixture in the inner outlet cavity.

12. The arrangement in accordance with to claim 8, further comprising a further additional mixing cavity, wherein:

the additional mixing cavity is a first additional mixing cavity and the further additional mixing cavity is a second additional mixing cavity;

the first additional mixing cavity is formed in the interior of the helical component; and the second additional mixing cavity is formed in the interior of the outer component.

13. The arrangement in accordance with claim 8, wherein:

the gas mixer extends along a longitudinal axis; and an extension of the helical mixing cavity or an extension of the additional mixing cavity or the extension of the helical mixing cavity and the extension of the additional mixing cavity is smaller than an extension of the outer component along the longitudinal axis of the gas mixer.

14. The arrangement in accordance with claim 8, further comprising:

an inlet-side component;

an inlet cavity formed between the inner wall of the outer component, the inlet-side component and the helical component;

a first inlet cavity fluid connection of the inlet cavity with the helical mixing cavity or with the additional mixing cavity or with both the helical mixing cavity and with the additional mixing cavity; and a second inlet cavity fluid connection of the inlet cavity with the feed line for the first gas or with the feed line for the second gas.

15. A process comprising the steps of:

providing an arrangement comprising:

a first feed line configured to feed a first gas;

a second feed line configured to feed a second gas;

a gas mixture discharge line to discharge a gas mixture; and a gas mixer configured to mix the first gas and the second gas to form the gas mixture, the gas mixer comprising:

an outer component;

a helical component located in an interior of the outer component, an outer circumference of the helical component being in fluid-tight contact with an inner wall of the outer component;

a helical mixing cavity formed between the outer component and the helical component;

an additional mixing cavity formed in an interior of the helical component or in the interior of the outer component or in both the interior of the helical component and the interior of the outer component;

a radial duct connecting the additional mixing cavity to the helical mixing cavity;

a helical mixing cavity fluid connection of the helical mixing cavity with the feed line for the first gas;

an additional mixing cavity fluid connection of the additional mixing cavity with the feed line for the second gas;

a discharge fluid connection of the helical mixing cavity or the additional mixing cavity with the gas mixture discharge line for discharging the formed gas mixture;

an outlet-side component;

an inner outlet cavity in an interior of the outlet-side component, wherein the outer component fluid-tightly encloses the outlet-side component;

an inner outlet cavity fluid connection of the inner outlet cavity with the gas mixture discharge line;

an inner outlet cavity radial duct connecting the helical mixing cavity or the additional mixing cavity to the inner outlet cavity;

a gas sample cavity formed between the outer component and the outlet-side component;

a sample cavity radial duct connecting the inner outlet cavity to the gas sample cavity;

a sensor for testing the formed gas mixture; and a gas sample cavity fluid connection of the gas sample cavity with the sensor; and supplying the formed gas mixture from the gas mixer, via the gas mixture discharge line, to a ventilator, wherein the ventilator is configured for ventilation of a patient.

16. A process for manufacturing a gas mixer configured to mix a first gas and a second gas to form a gas mixture, the gas mixer comprising: an outer component; a helical component located in an interior of the outer component, an outer circumference of the helical component being in fluid-tight contact with an inner wall of the outer component; a helical mixing cavity formed between the outer component and the helical component; an additional mixing cavity formed in an interior of the helical component or in the interior of the outer component or in both the interior of the helical component and the interior of the outer component; a radial duct connecting the additional mixing cavity to the helical mixing cavity; a helical mixing cavity fluid connection of the helical mixing cavity with one of a feed line for the first gas and a feed line for the second gas; an additional mixing cavity fluid connection of the additional mixing cavity with the other one of the feed line for the first gas and the feed line for the second gas; a discharge fluid connection of the helical mixing cavity or the additional mixing cavity with a gas mixture discharge line for discharging the formed gas mixture; an outlet-side component; an inner outlet cavity in an interior of the outlet-side component, wherein the outer component fluid-tightly encloses the outlet-side component; an inner outlet cavity fluid connection of the inner outlet cavity with the gas mixture discharge line; an inner outlet cavity radial duct connecting the helical mixing cavity or the additional mixing cavity to the inner outlet cavity; a gas sample cavity formed between the outer component and the outlet-side component; a sample cavity radial duct connecting the inner outlet cavity to the gas sample cavity; a sensor for testing the formed gas mixture; and a gas sample cavity fluid connection of the gas sample cavity with the sensor, the process comprising the step of:

providing a computer program, which can be executed on a computer and when executed prompts the computer to actuate a 3D printer such that the actuated 3D printer produces one or more of the outer component and the helical component.

* * * * *